June 23, 1959 J. GORDON 2,892,176
MULTIPLE DOVETAILED TERMINAL BLOCKS
Filed March 10, 1955 4 Sheets-Sheet 1
FIG. 1
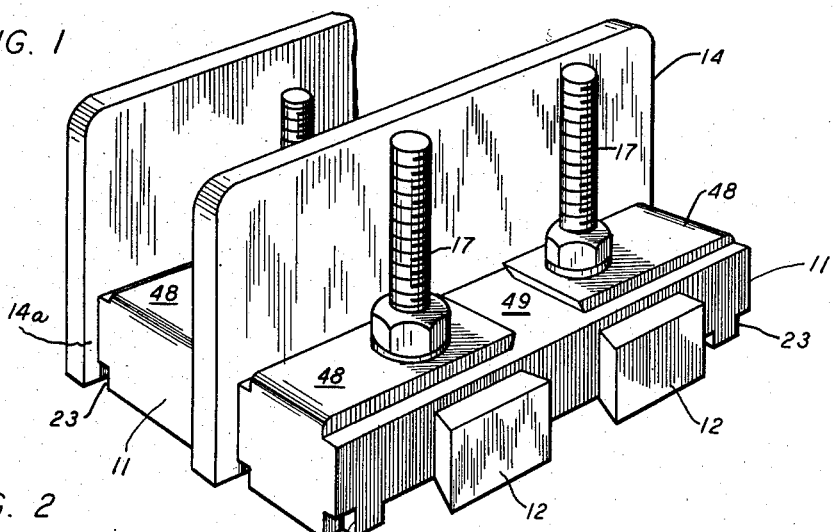
FIG. 2
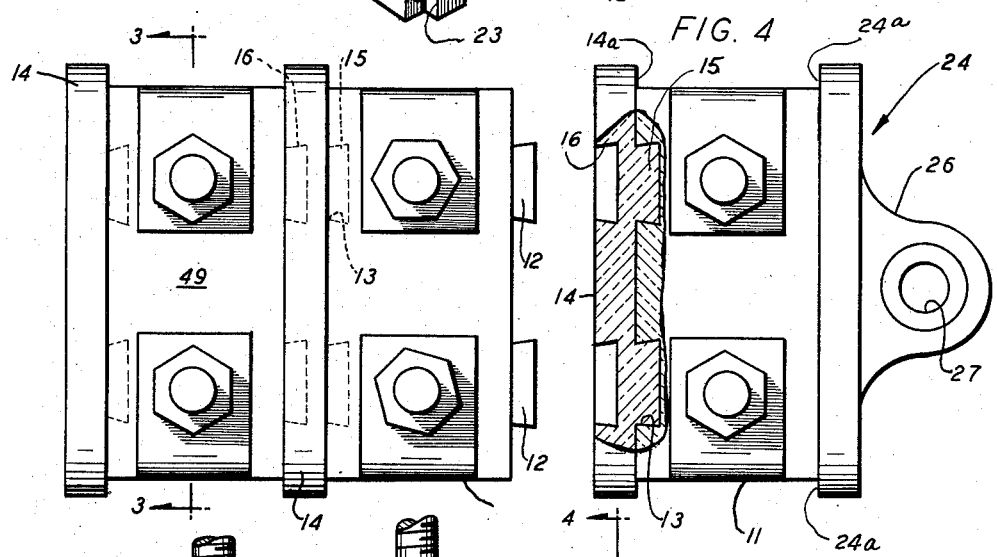
FIG. 4
FIG. 3
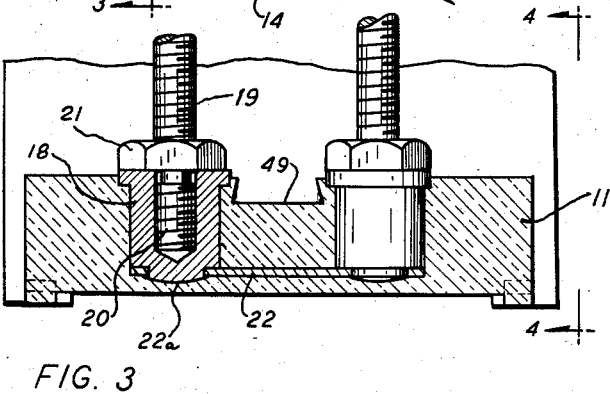
INVENTOR.
JAMES GORDON
BY
Jones, Tesch & Danbo
ATTORNEYS June 23, 1959 J. GORDON 2,892,176
MULTIPLE DOVETAILED TERMINAL BLOCKS
Filed March 10, 1955 4 Sheets-Sheet 2

INVENTOR.
JAMES GORDON
BY Jones, Tesch & Darbo
ATTORNEYS

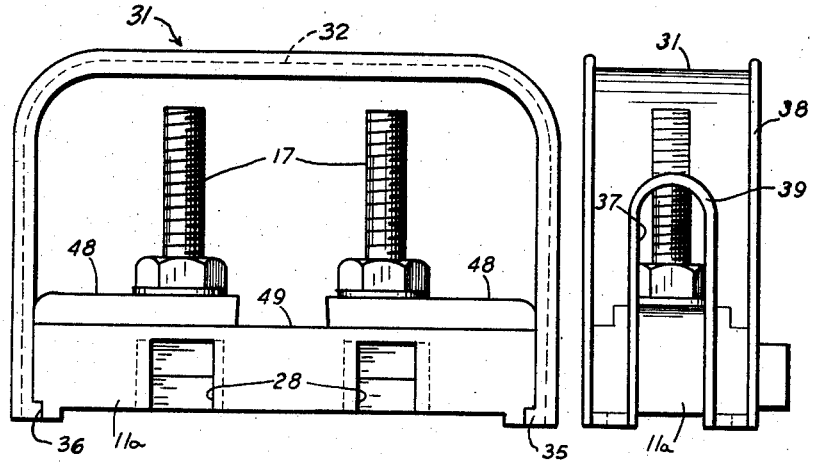
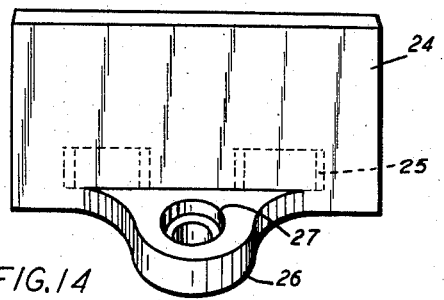
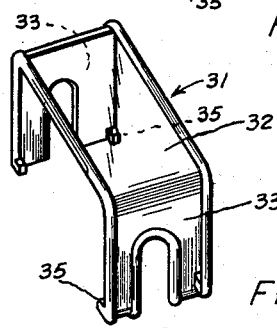
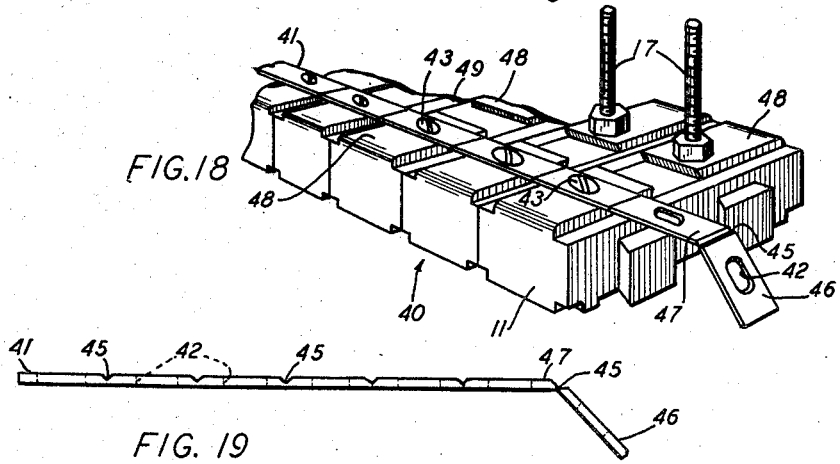

June 23, 1959
J. GORDON
2,892,176
MULTIPLE DOVETAILED TERMINAL BLOCKS
Filed March 10, 1955
4 Sheets-Sheet 4
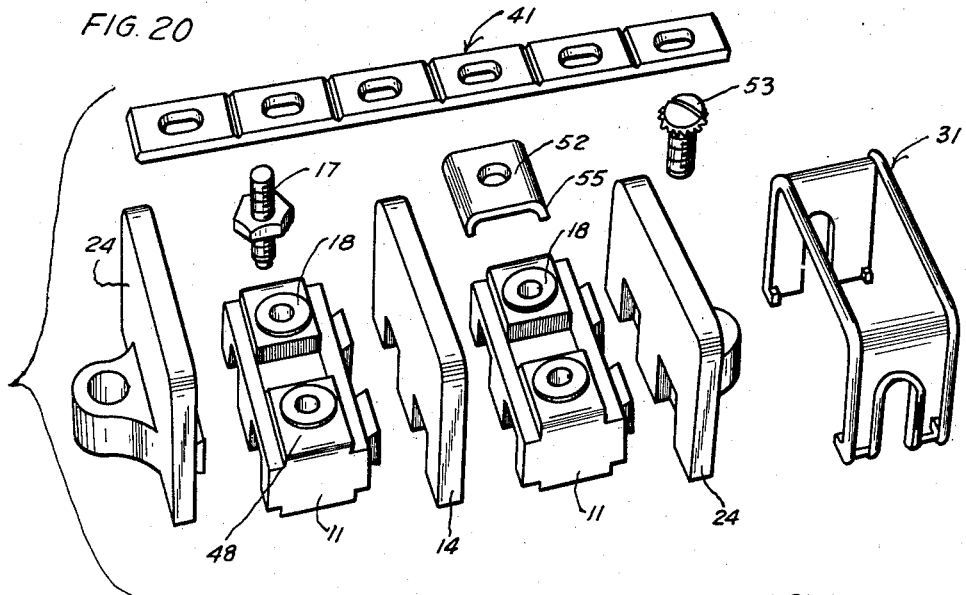
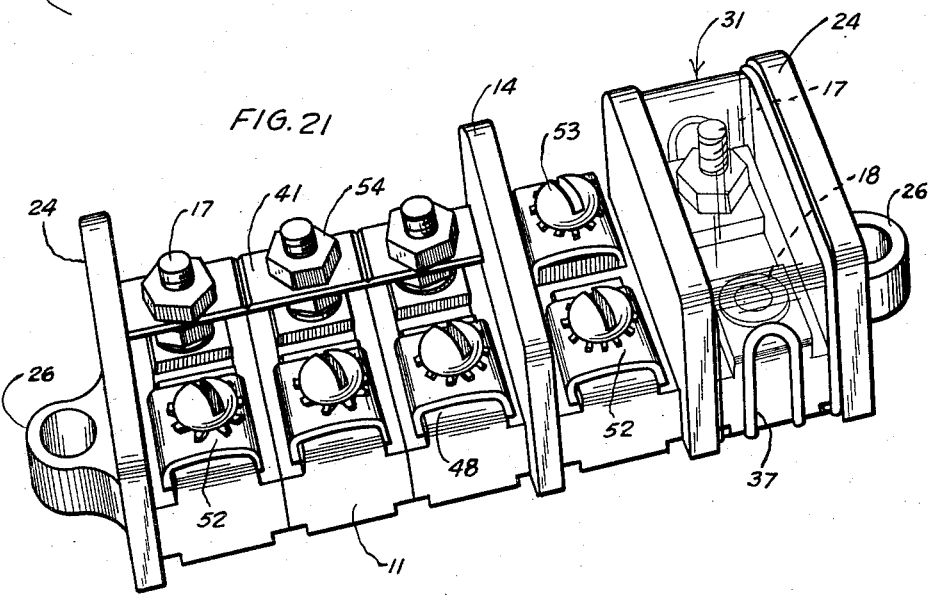
INVENTOR.
JAMES GORDON
BY
Jones, Tesch & Darbo
ATTORNEYS United States Patent Office 2,892,176
Patented June 23, 1959

2,892,176
MULTIPLE DOVETAILED TERMINAL BLOCKS

James Gordon, Little Rock, Ark.

Application March 10, 1955, Serial No. 493,534

8 Claims. (Cl. 339—198)

This invention relates to improvements in multiple terminal blocks or the like including those of the class described in my copending application Serial No. 262,023 filed December 7, 1951, Patent No. 2,726,375 issued December 6, 1955, and which are suitable for use in wiring electrical apparatus such as switchboards, control circuits, test circuits and other assemblies.

The present improvements provide enhanced adaptability of the blocks to varying requirements of wiring service whereby there may be selectively made up, by means of the present expedients, a variety of suitably different arrangements of wiring facilities, both as terminal and as distribution blocks, together, in some instances, with desirable protection means for block units affording enhanced protection against accidental contacts or the entry of foreign material or influences. In an important aspect, the present invention contemplates, separable barrier members, both intermediate and end members, that may be selectively assembled with various combinations of block sections, and that desirably extend beyond the sections, for the purpose, among other things, of mating with removable sectional cover means.

These and other objects and advantages will be apparent from the following description, taken together with the accompanying drawings, of illustrative embodiments of the improvements, and in which drawings—

Figure 1 is a perspective view of one arrangement embodying a present invention;

Figure 2 is a plan view of the arrangement shown in Fig. 1;

Figure 3 is a section taken on the line 3—3 of Fig. 2;

Figure 4 is a view of a mounting arrangement, partially in cross-section for clearness;

Figure 14 is the enlarged perspective view of one of the combined barrier and mounting members shown in Fig. 4 and also in Figs. 11, 12 and 13;

Figure 15 is a view somewhat similar to Fig. 6 but with an associated block cover;

Figure 16 is an end view of the arrangement of Fig. 15;

Figure 17 is a perspective view, on a reduced scale, of the cover shown in Figs. 15 and 16;

Figure 18 is a perspective view of another selective arrangement showing use as a distribution block;

Figure 19 is a separated view of the bus bar shown in Fig. 18;

Figure 20 is a view before assembly of parts heretofore shown, selected for another useful arrangement; and Figure 21 is a perspective view of the assembly of the parts shown in Fig. 20.

Figures 8, 9:
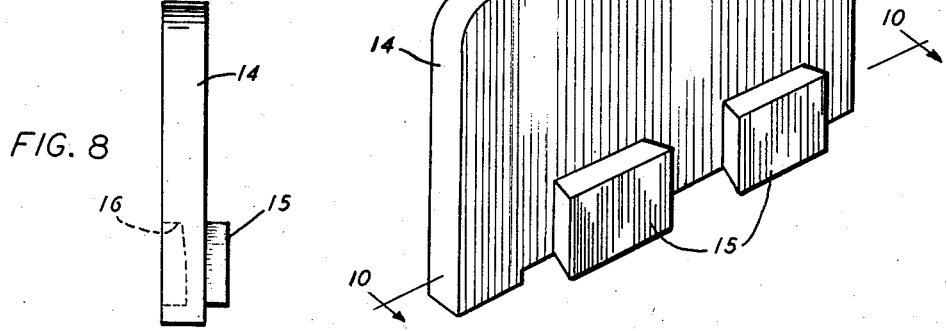
Figure 8 is an end view of one of the separable barriers shown in Figs. 1 to 4.
Figure 9 is a perspective view of the barrier of Fig. 8.
Figure 10:
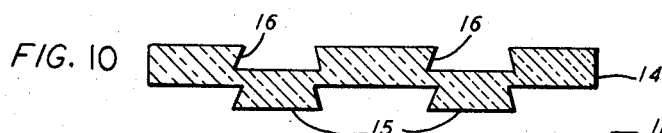
Figure 10 is a cross-section taken on the line 10—10 of Fig. 9.

Referring in detail to the illustrative constructions shown in the drawings, and turning first to Figs. 1 to 3 inclusive, there is there shown a pair of block sections 11 made of suitable insulating material such as a phenolic condensation product, hard natural or synthetic rubber or the like, and molded under the influence of heat and pressure to the desired shape, for example, here illustrated. Each block on one of its side faces, carries interengaging means such as a pair of dovetail shape tongues 12, and, on its opposite face, a pair of dovetail grooves 13. Between two adjacent block sections 11 is inserted, in accordance with the present invention a separable barrier member 14, as seen in Figs. 1 and 2 and again shown by itself in Figs. 8, 9 and 10, also of insulating material and provided on one of its faces with a pair of dovetail tongues 15 and on its opposite face with a pair of dovetail grooves 16.

Rising from each of the block units 11 is a pair of metallic terminal posts 17, which, as best seen in Fig. 3, advantageously each comprises separable terminal parts including a socket 18 and stud 19 interconnected by a screw threaded stud portion 20 that is threadedly received in the socket 18, the stud 19 having an integral non-circular flange 21 that facilitates the screwing operation. The socket parts 18 are embedded into the block body section 11 during molding, and molded therein with them is a connector link 22 that is riveted as at 22a to each of the sockets 18 of a block section.

Further in accordance with the present invention, the lower edge corners of each of the block sections 11 are notched as at 23 for a purpose later more particularly described.

Figure 12:
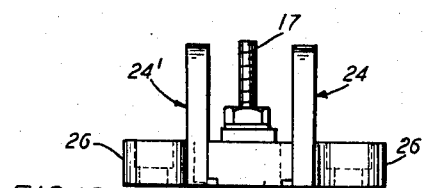
Figure 12 is an end view of the arrangement in Figure 11.
Figure 11:
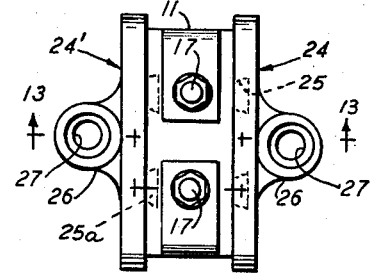
Figure 11 is a reduced plan view of another block and barrier arrangement.
Figure 13:
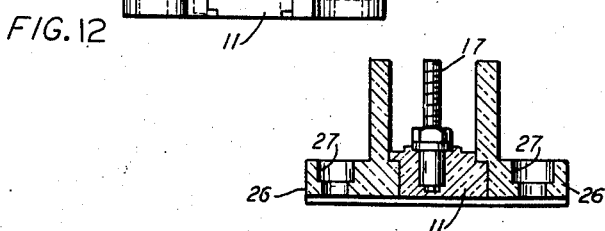
Figure 13 is a section taken on the line 13—13 of Fig. 11.

Fig. 4 shows a single block section 11 associated with one of the barrier members 14 on one side of the block and on the other side a combined barrier and mounting member 24 of insulating material. Like the barrier 14 the member 24 is provided (Fig. 11) on one of its faces with a pair of dovetail grooves 25 for a right hand member and dovetail tongues 25a for a left hand member, the members 24 being right and left as shown (as indicated at 24 and 24' Fig. 11). Each member 24 on its other face is formed into an integral mounting lug 26 that has a perforation 27 therethrough for passage of a mounting screw (not shown) by which the block unit may be mounted on a panel or other support. It will be understood that for this purpose, if the terminal block unit is to comprise only one block section, as shown in Figs. 11, 12 and 13, one of these combined barrier and mounting members, such as shown in perspective in Fig. 14, may be assembled at each side of the block section 11. Alternatively any number of block sections may be assembled between two members 24, and in such case each adjacent pair might have a barrier member therebetween as in Figs. 1 and 2. Both the barrier members 14 and the combined barrier and mounting member 24 extend beyond the block sections at each end of a section as at 14a and 24a.

Figure 5:
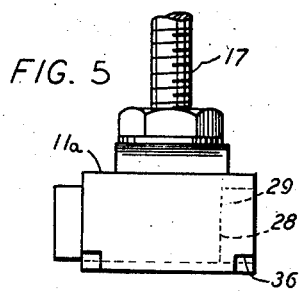
Figure 5 is an end view of a block itself.
Figure 6:
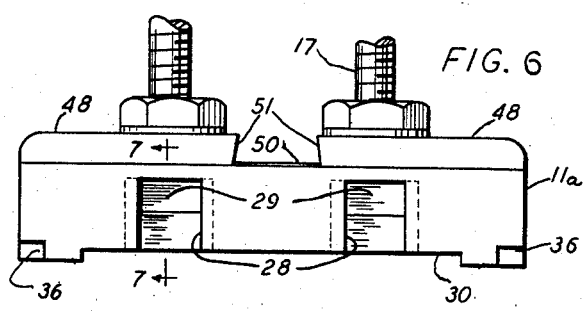
Figure 6 is a side elevational view of the block of Fig. 5.
Figure 7:
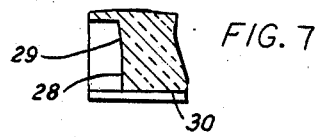
Figure 7 is a fragmentary vertical section taken on the line 7—7 of Fig. 6.

Figs. 5, 6 and 7 show a block section 11a alone without the barrier members and illustrate how the dovetail grooves 28 are desirably formed as more particularly described and claimed in my said Patent No. 2,726,375 so that the upper portion 29 only of the back wall of each groove is tapered by an inclination beginning approximately one-half of the height of the groove and from there inclined toward the face of the corresponding tongue on an adjoining section, the bottom face of each block section being undercut intermediately of the margin portions of the section, as at 30, and the tongues and grooves extending upwardly from said undercut, so that the effect of the inclination 29 is brought into play at the end only of relative movement of the tongue and groove to lock the sections securely together as by wedging action. This wedging action, coming into play only at the end of the movement, avoids strains on the dovetail and permits normal manufacturing tolerances.

Figs. 15 and 16 show one of the block sections 11a (and the same thing can be done with the section 11) provided with a cover 31 desirably formed of a transparent insulating material such as one of these synthetic plastics readily available on the market and formed in the shape best seen in Fig. 17 having the top 32 and ends 33, but without any sides or bottom, the cover being of a suitable length to extend from end to end of the block section 11a with the cover ends 33 lapping the block ends, and being of a suitable height to span the terminal posts 17 of the block. For interlocking purposes, the cover 31 is provided at each lower corner with a lug 35 one of which enters each of the notches 36 of the block 11a respectively. Similar notches 23 are referred to in the description of the block 11. The plastic, as is well known, may have sufficient inherent resilience so that the ends 33 of the cover may be temporarily sprung apart to permit the lugs 35 to engage in the notches 36 whereupon the cover springs back to its normal shape to maintain interlock until it be desired to forceably remove it. Each end of the cover is desirably apertured by a slot 37 to permit passage of the conductor wires (not shown) to the terminal posts 17. For strengthening purposes, the cover is advantageously ribbed or is provided with a bead edge as at 38, as may also be the margin of the slot 37 as at 39.

By means of the cover 31, the terminal posts 17 with their connections to the conductor wires, are protected against access of dirt, moisture and other foreign material, and the influence of changing temperatures, while, at the same time, by reason of the transparency of the material of the cover the connections of the terminal posts may be observed at all times. If desired ready access may be had thereto by removal of the cover. It will be understood that the sides of the block section for which no cover parts are provided, are closed in normal use by barrier members 14 as in Figs. 1 and 2, or by the combination barrier and mounting members 24 as in Figs. 11, 12 and 13, the cover member being shaped to match the shape and size of the barrier member to complete the enclosure of the block section. The extensions 14a of the barrier members and 24a of the combined barrier and mounting members project slightly beyond the ends of the cover member 31 to provide closures for the cover at each side. It will be understood that the cover members may be used between any two of the barrier members or between a barrier member and a combined barrier and mounting member. (See Fig. 21.)

Turning now to Figure 18, it will be seen how, in accordance with the present invention, a plurality of block sections 11 may be assembled together to make up a distribution block assembly 40. For this purpose, the stud parts 19 of the terminal posts 17 are omitted at one end of each block from each of the block sections 11 of the composite distribution block 40 so that the socket parts 18 at registered ends of the block sections may be electrically connected by a common bus bar 41, this bus bar, as best seen in Fig. 19, having a series of perforations 42 therealong through which may be passed clamping screws 43 that pass threadedly into the socket parts 18. At the opposite ends of each block section 11 the stud parts 19 are associated with the sockets to provide terminal posts 17. In this way, the terminal posts 17 of the distribution block assembly 40 are in electrical parallelism from the bus bar 41.

Further in accordance with the present invention, the bus bar 41 is made in integral sections, each of a length adapted to the width of one of the block sections 11, with kerfs 45 between the bus bar sections to provide a weakened portion thereat by which the bus bar may be readily broken off to the desired length to adapt itself to the number of block sections 11 arranged together for a particular distribution block. The bus bar may be so broken to the length desired by bending it along the line of one of the kerfs 45 as indicated at 46 (Figs. 18 and 19). In Fig. 18 the bus bar section 47 would normally also be broken off, thus terminating the bus bar 41 short of the lateral edge of the end block section 11. Thereupon one of the combination barrier and mounting members 24 can be assembled with each end block section 11 so that the distribution block 40 as a whole can be mounted by means of the integral mounting lugs 26 on such end barriers.

Platform portions 48 on the block sections 11 and 11a, from which the terminal posts rise, are advantageously separated by a gap 49 which may be usefully employed to receive a tab 50 (Fig. 6) carrying indicia serving to identify the terminals, the appropriate indicia being located opposite the terminal to which it pertains. The walls of the gap 49 may be undercut as at 51 to retain the tab 50 therein against accidental displacement.

Figures 20 and 21 show another selective arrangement involving parts already described and in addition parts such as clamping clips 52 and clamping screws 53, which are assembled to provide a composite block constituting a distribution block at the left hand end (with three sections), an uncovered terminal block next, and a covered terminal block at its right hand end, with end members 24 by which the whole may be mounted. Here a bus bar 41 of appropriate length for three block sections is placed on the three terminal posts 17 for the distribution block arrangement, while the stud parts 19 of the terminal 17 are omitted at the other ends of the corresponding block sections. The bus bar 41 may be clamped to the terminals 17 by nuts 54 on each terminal, and wires (not shown) may be clamped to the socket parts 18 of the other terminal members for each block by the clips 52 and screws 53, as desired. The clips 52 desirably have flanges 55 which lap over the edges of the platform portions 48 of the block section for additional securement.

While different dimensions of parts are here shown in the various views, for illustrative purposes, and in some instances to save space, it will be understood that in practice the parts are desirably so dimensioned as to be fully interchangeable one with another while accommodating and permitting the versatility of arrangements hereinabove described and illustrated in the drawings, and even still other arrangements which may not be here specifically shown but which the worker in the art will readily visualize with the teaching of the description and specific arrangements that are shown.

The invention is not to be understood as limited to details of construction here shown for purpose of illustration, and furthermore, it is not essential that all features of the improvements be combined, since various combinations and sub-combinations may be employed while utilizing the teachings of the present disclosure.

The improvements having been illustrated, in accordance with the statute, such adaptations, including modifications and additions, may be made as fall within the scope of the appended claims without departing from the invention.

What is here claimed is:

1. In a multiple terminal block of the class described, a plurality of separable block sections each having a pair of dovetail tongues on one face thereof and a pair of dovetail grooves on its opposite face, a relatively thin separable barrier member between said blocks respectively, said barrier also having a pair of dovetail tongues on one face thereof and a pair of dovetail grooves on its opposite face and said grooves in the barrier being arranged to receive the tongues on one of said blocks and said tongues on the barrier being arranged to be received in the grooves of the other of said blocks, a pair of relatively thin mounting barrier members at the ends of the sections respectively, one of said mounting barrier members having a pair of dovetail tongues on one face arranged to be received in the grooves of one of said block sections and having on its other face a perforated mounting lug, the other of said mounting barrier members having on one face a pair of dovetail grooves arranged to receive the tongues in another of said block sections and having on its other face a perforated mounting lug, the lower four corners of said block sections being notched, and a resilient inverted U-shape cover conforming generally in cross-section to the shape of the barriers and extending between one of a pair of said barrier members, said cover having lugs at each of its lower four corners arranged to spring into the notches in the block sections.

2. In a multiple terminal block of the class described, a separable block section each having a pair of dovetail tongues on one face thereof and a pair of dovetail grooves on its opposite face, a pair of relatively thin separable barrier members on each side of said block, one of said barriers having a pair of dovetail tongues on one face thereof and said grooves in the block section being arranged to receive the tongues on one of said barriers and said tongues on the other of said barriers being arranged to be received in the grooves of the block, the lower four corners of said block section being notched, and a resilient inverted U-shape cover conforming generally in cross-section to the shape of the barriers and extending between said barrier members, said cover having lugs at each of its lower four corners arranged to spring into the notches in the block sections.

3. In a multiple terminal block of the class described, a plurality of separable block sections each having a pair of dovetail tongues on one face thereof and a pair of dovetail grooves on its opposite face, a relatively thin separable barrier member between said blocks respectively, said barrier also having a pair of dovetail tongues on one face thereof and a pair of dovetail grooves on its opposite face and said grooves in the barrier being arranged to receive the tongues on one of said blocks and said tongues on the barrier being arranged to be received in the grooves of the other of said blocks, and a pair of relatively thin mounting barrier members at the ends of the sections respectively, one of said mounting barrier members having a pair of dovetail tongues on one face arranged to be received in the grooves of one of said block sections and having on its other face a perforated mounting lug, the other of said mounting barrier members having on one face a pair of dovetail grooves arranged to receive the tongues in another of said block sections and having on its other face a perforated mounting lug.

4. In a multiple terminal block of the class described an insulating block section having a pair of dovetail grooves on one face thereof and a pair of dovetail tongues on its other face, a relatively thin separable barrier member having a pair of dovetail tongues on one face thereof arranged to be received in the grooves of the block section and having a pair of dovetail grooves on its opposite face arranged to receive the tongues of the block section selectively, said barrier being of larger area than the overall cross-sectional area of the block section whereby to extend therebeyond in at least three directions, said barrier member being imperforate.

5. In a multiple terminal block embodying an insulating body and a pair of metallic terminals carried thereby, that improvement wherein the body is notched at its lower four corners and an inverted U-shape cover member is engaged over said body spanning said terminals, said cover member having inwardly extending lugs at its lower four corners engaging in the notches in the body to retain the cover thereon, and a pair of barriers lapping the body on each side thereof respectively and closing the U of the cover on each side thereof, each barrier margining the notches on its side of the body and cover.

6. The structure of claim 5 wherein the cover is of inverted U-shape extending from end to end of the block section and is of a transparent insulating plastic material.

7. The structure of claim 5 wherein the cover has a slot at each end to receive a wire therethrough and is beaded along the margin of said slot and the margins of the cover for strengthening purposes.

8. In a multiple terminal or distributing block embodying a plurality of individual block sections, a pair of separable barrier members, interengaging means on said barriers and sections at each side of one of said sections, said barrier members extending in both directions beyond the section laterally of a line connecting the sections and in the plane thereof, notches in lower corners of the sections, and an inverted U-shape insulating cover of resilient material comprising a top and ends telescoped over the section between said barriers and having lugs springly engaging said notches, said barrier being of larger area than the overall area of said cover to protect the cover.

References Cited in the file of this patent

UNITED STATES PATENTS

| | | |
|---|---|---|
| 1,579,400 | Samuels | Apr. 6, 1926 |
| 1,659,303 | Rovere | Feb. 14, 1928 |
| 1,926,927 | Woertz | Sept. 12, 1933 |
| 1,936,963 | Dutzmann | Nov. 28, 1933 |
| 2,178,092 | Werner | Oct. 31, 1939 |
| 2,351,942 | Dyer et al. | June 20, 1944 |
| 2,427,908 | Hill et al. | Sept. 23, 1947 |
| 2,526,255 | Milbank | Oct. 17, 1950 |
| 2,544,180 | Richards | Mar. 6, 1951 |
| 2,623,087 | Latta | Dec. 23, 1952 |
| 2,780,791 | Morschel | Feb. 5, 1957 |

FOREIGN PATENTS

| | | |
|---|---|---|
| 680,499 | Germany | Aug. 30, 1939 |